Oct. 25, 1960 TOMIJI TARUKAWA 2,957,606
APPARATUS FOR AUTOMATICALLY CHARGING A
PREDETERMINED AMOUNT OF A FLUID
Filed Aug. 15, 1958 4 Sheets-Sheet 1

INVENTOR
TOMIJI TARUKAWA
BY
*[signature]*
ATTORNEY

Oct. 25, 1960

TOMIJI TARUKAWA 2,957,606

APPARATUS FOR AUTOMATICALLY CHARGING A
PREDETERMINED AMOUNT OF A FLUID

Filed Aug. 15, 1958

4 Sheets-Sheet 2

INVENTOR
Tomiji Tarukawa
BY
ATTORNEY

Oct. 25, 1960 TOMIJI TARUKAWA 2,957,606
APPARATUS FOR AUTOMATICALLY CHARGING A
PREDETERMINED AMOUNT OF A FLUID
Filed Aug. 15, 1958

INVENTOR
TOMIJI TARUKAWA
BY
ATTORNEY

Oct. 25, 1960  TOMIJI TARUKAWA  2,957,606
APPARATUS FOR AUTOMATICALLY CHARGING A
PREDETERMINED AMOUNT OF A FLUID
Filed Aug. 15, 1958  4 Sheets-Sheet 4

INVENTOR
Tomiji Tarukawa
BY
ATTORNEY

United States Patent Office 2,957,606
Patented Oct. 25, 1960

2,957,606

APPARATUS FOR AUTOMATICALLY CHARGING A PREDETERMINED AMOUNT OF A FLUID

Tomiji Tarukawa, 5556 Kamiitabashi 5-chome, Itabashiku, Tokyo, Japan

Filed Aug. 15, 1958, Ser. No. 755,283

Claims priority, application Japan Aug. 27, 1957

5 Claims. (Cl. 222—65)

The present invention relates to an improved apparatus for automatically charging a predetermined amount of a fluid, particularly a liquid.

Hitherto devices for automatically charging a predetermined amount of a fluid have been controlled by a complicated mechanical device or by hand.

One object of the present invention is to discharge a mass of accurately measured fluid merely by the manual closing of a switch.

Another object of the present invention is to automatically sequentially charge a tank with a predetermined amount of a fluid after a previous charge has been dispensed and to keep it in the condition to be discharged.

Still another object of the present invention is to automatically discharge a predetermined amount of a fluid after it has been charged into a tank.

According to the present invention an apparatus for automatically charging a predetermined amount of a fluid comprises, in combination, a tank, a charging device having a feed valve and electric means for operating same, a discharging device having a discharge valve and electric means for operating same, measuring means for charging said tank with a predetermined amount of a fluid, a changing device for electrically opening said feed valve as well as closing said discharge valve and for electrically opening said discharge valve as well as closing said feed valve, electric means for operating said changing device and switch means connected to last mentioned electric means.

In order that the present invention may be more clearly understood, reference will now be made to the accompanying drawings which show, by way of example, embodiments of the present invention, in which:

Figures 1, 2, 3 and 4 are diagrammatical views according to the present invention.

Figure 1:
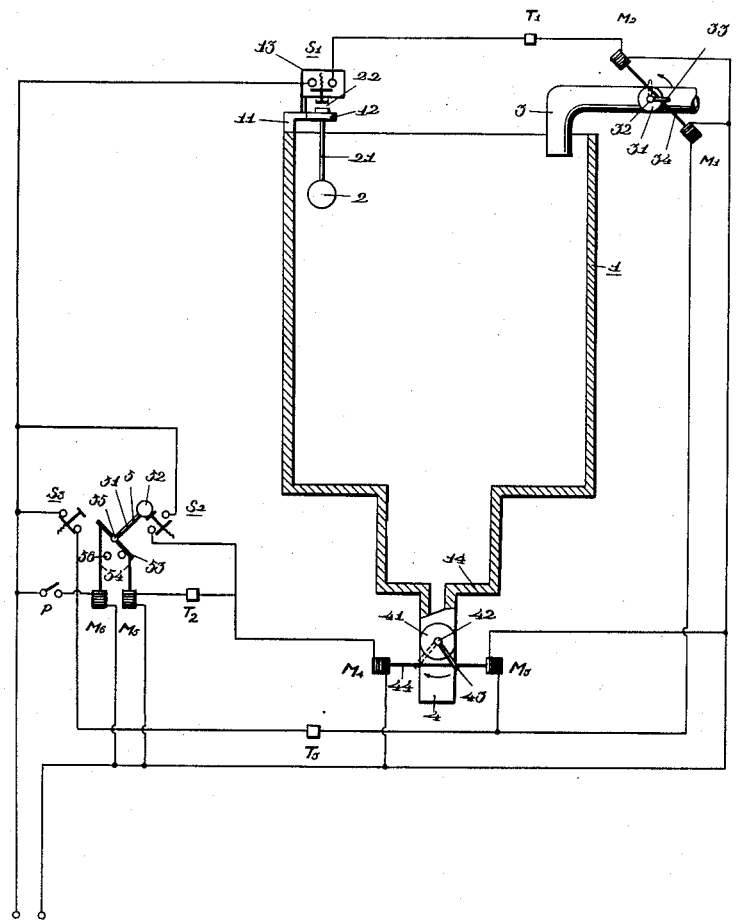

Figure 1 shows an embodiment of the present invention Numeral 1 indicates a tank on which a bracket 11 is mounted. A supporting rod 21 with a float 2 is supported by said bracket for vertical translation. On the upper end of said rod is fixed a switch operating element 22. A switch S1 is mounted on a fixing plate 13 integral with bracket 11 and is adapted to be closed only when element 22 is moved upwardly by float rod 21, from the position shown. The tank is provided with a supply pipe 3 having a feed valve 31, a valve rod 32 of which is attached to an operating lever 33 for opening and closing said valve 31. A steel wire 34 which is connected at its respective ends to armatures of electromagnets M1 and M2 is fixed to said lever 33. The feed valve 31 is opened and closed by exciting the electromagnets M1 and M2 respectively. On the bottom plate 14 of the limited hollow in the center of the tank bottom is provided a discharge pipe 4 having a discharge valve 41, a valve rod 42 of which is attached to an operating lever 43 for opening and closing said valve. A steel wire which is connected at its respective ends to armatures of electromagnets M3 and M4 is fixed to said lever 43. Outside of the tank 1 is provided a changing device made of a rapid change checking mechanism such as a bell-crank 5, on an arm 51 of which a ball or weight 52 is screwed. To the ends of the other arm 53 are attached steel wires 54 and 54 which are connected to armatures of electromagnets M5 and M6 for changing the position of the bell-crank. When the electromagnets M5 and M6 are excited alternately, the position of the ball 52 is changed from side to side turning around the pivot 55. Switch S2 or S3 provided at the extreme positions of the bell-crank is thereby opened or closed by pivoting the bell-crank so as to control opening and closing of the discharge valve 41 and the feed valve 31. It will be noted that switches S2 and S3 are normally urged to closed position. The turning angle of the bell-crank is limited by stops 56 and 56. A time limit switch T1 is inserted in the circuit between the switch S1 and the electromagnet M2 so as to limit an exciting interval of the electromagnet M2. A time limit switch T2 is in the circuit of electromagnet M5 to excite it a certain time after the tank has been emptied through valve 41. A time limit switch T3 is in the circuit of magnets M1 and M3 and limits the excitation interval of said electromagnets M1 and M3. P indicates a push button switch.

The operation of the apparatus shown in Figure 1 is as follows:

Figure 1 corresponds to the state in which the discharge valve 41 is closed and the feed valve 31 is opened after discharging a predetermined amount of a fluid. The tank is charged with a fluid through the feed valve 31. The level of fluid in the tank rises and moves float 2 and switch-operating element 22 upwardly. When the level of fluid reaches a predetermined level, switch S1 is closed by plate 22 so that the electromagnet M2 is excited and the operating lever 33 is turned in the direction of the arrow to the closed position shown by the dotted line, to stop further inflow of fluid. The electromagnet M2 is demagnetized a short time after excitation by the time limit switch T1. Thus the tank 1 is charged with a predetermined amount of fluid, and charging of fluid is stopped automatically. It is only necessary to operate the push button switch P for discharging said fluid. When the electromagnet M6 is excited by closing switch P, the arm 53 of the bell-crank is pivoted by the steel wire 54 connected thereto, about pivot 55 so that arm 51 is turned to the side of the switch S3 to open it in a position limited by stop 56. Switch S2 therefore is closed, the electromagnet M4 is excited, the operating lever 43 is turned to the position of the dotted line, in direction of the arrow shown, whereby the discharge valve 41 is opened, and the discharge of fluid begun. As the fluid level in tank 1 drops and float 2 moves downwardly, switch S1 is opened and the time limit switch T1 is restored to its former state. Immediately after the completion of the discharge the electromagnet M5 is excited through the time limit switch T2, the arm 51 is turned to open switch S2 switch S3 is closed. The circuit of the electromagnet M4 is thus opened, the electromagnet M3 is excited, the operating lever 43 is turned to close valve 41 and at the same time the electromagnet M1 is excited, to thereby open feed valve 31. Thereby another filling of tank 1 is initiated. Thus closing of the discharge valve 41 and opening of the feed valve 31 are effected after the previous charge of fluid has been dispensed. The electromagnets M1 and M3 are demagnetized by the time limit switch T3 so that unnecessary excitation is avoided.

The charge and discharge of a fluid may be effected by one pipe at the bottom of the tank, said pipe being provided with a discharge valve and a feed valve.

Bracket 11 mounting float 2 and its associated parts, may be made vertically adjustable within the tank so that any predetermined volume of fluid within the limits of the tank's capacity may be measured and discharged in the manner previously described. Furthermore, a switch, not shown, may be substituted for time switch T2, to be closed as the level of fluid in tank 1 drops to a predetermined level in which the tank is substantially empty.

Figure 2:
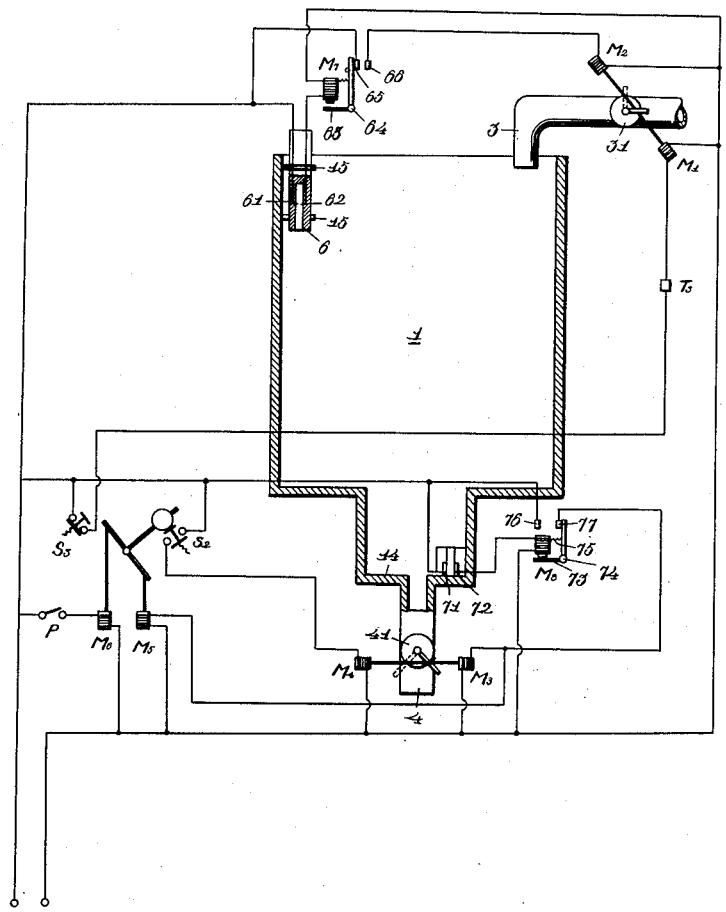

Figure 2 shows another embodiment of the present invention wherein insulated cylinders 6 provided with two electrodes opposite to each other may be substituted for the float device 2 and the time limit switch T2 shown in Figure 1, so as to control closing of the feed valve and opening of the discharge valve. As the fluid level in the tank rises, said cylinder attached by mounting members 15 to the upper inside wall of the tank 1, is immersed in fluid. When said electrodes 61 and 62 are short-circuited by fluid magnet M7 is excited, and thereby the L shaped lever 63 is turned around the pivot 64. The contact 65 on the end of said lever engages with the contact 66 thereby exciting the electromagnet M2 so that feed valve 31 is closed. As above mentioned, the discharge valve 41 is opened when electromagnet M4 is energized in response to manual closing of switch P and the discharge of a fluid is effected. When the fluid level drops below the level of electrodes 71 and 72 which are in position corresponding to the bottom of the tank 1, the circuit of electromagnet M8 is thereby opened. The L shaped armature lever 73 is turned by the spring 75 around the pivot 74 in the direction of the arrow shown so that the contacts 76 and 77 engage to thereby energize electromagnet M3 and close valve 41. At the same time electromagnet M5 is excited, feed valve 31 is opened, and the next charge of fluid is begun. When the electrodes 71 and 72 are shorted by fluid, the electromagnet M8 is excited so that the L shaped lever 73 is restored to the position shown thereby opening the circuits of electromagnets M3 and M5.

Figure 3:
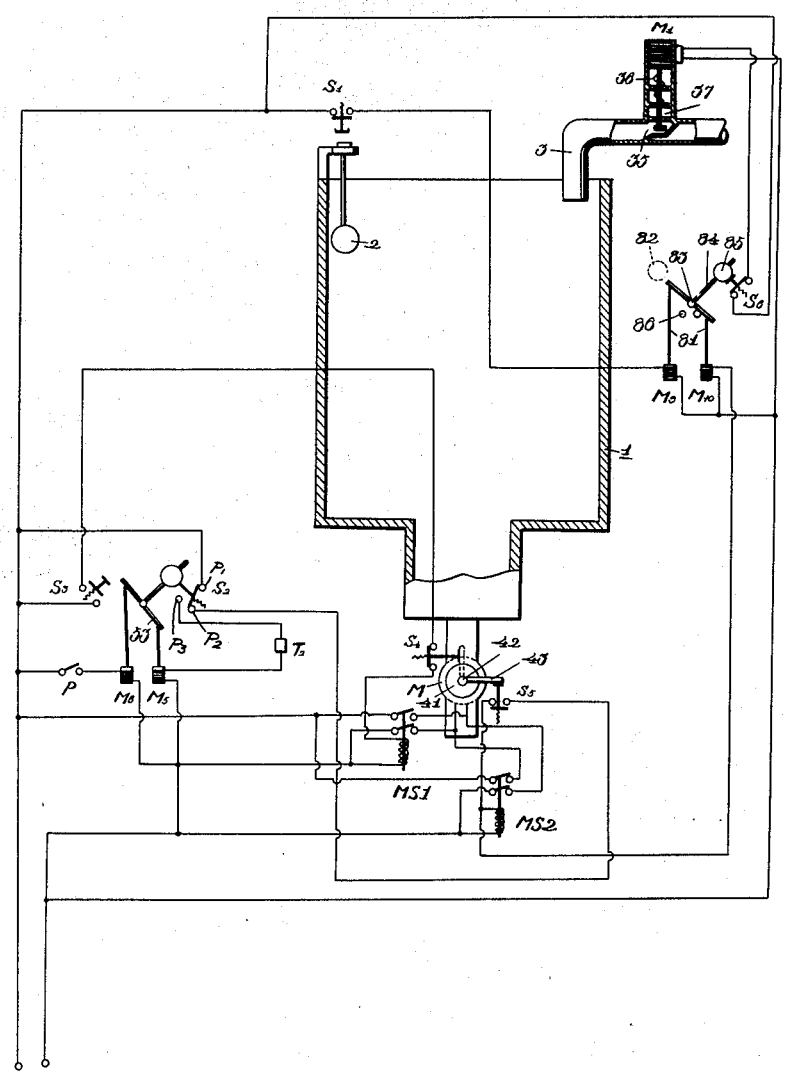

Figure 3 shows still another embodiment of the present invention. When the fluid level in the tank 1 reaches a predetermined level, switch S1 is moved to closed position by float 2 and electromagnet M9 is thereby excited. The operating lever 86 of the bell-crank is pulled downward by wire 81, and the other lever 84 with ball 85 is turned around the pivot 83. This turning is limited by the stop 86. The normally closed switch S6 is thus opened and the circuit of the electromagnet M11 is opened so that the valve 35 is closed by valve spring 36. In order to discharge fluid switch P is manually closed to thereby energize electromagnet M6 and close switch S3. Since switch MS1 is in series with electromagnet M6, by way of normally closed switch S4 and presently closed switch S3, the aforesaid switch MS1 is closed to effect operation of motor M and thereby turn arm 43 to the dotted line position wherein switch S4 is opened. Opening of switch S3 de-energizes the holding coil of switch MS1 whereby motor M is stopped. Valve 41 is thus opened to initiate discharge of fluid.

Simultaneously with the aforesaid closing of switch S3, switch S2 is actuated to bridge contacts P1 and P3. This would close a circuit through electromagnet M5 except for a time switch T2 in series therewith. After the charge of fluid in the tank has been dispensed, switch T2 closes, electromagnet M5 is energized to return bellcrank 53 to the position shown in Figure 3, wherein contacts P1 and P2 of switch S2 are electrically connected. A circuit is thereby closed from one side of the line, through presently closed switch S5 and the operating solenoid of relay switch MS2, to the other side of the line.

Closure of relay switch MS2 energizes reversible motor M to reverse its previous direction of rotation and return valve lever 43 to the closed full-line position of Figure 3. As lever 43 moves into full valve-closing position, it engages and opens switch S5 thereby de-energizing the solenoid of relay switch MS2 and stopping the motor. At the same time the electromagnet M10 is excited so that the ball 85 is turned to the position shown through the steel wire 81, the switch S6 is closed, thereby the electromagnet M11 is excited, the valve 35 is opened, and the charging of the fluid is begun.

Figure 4:
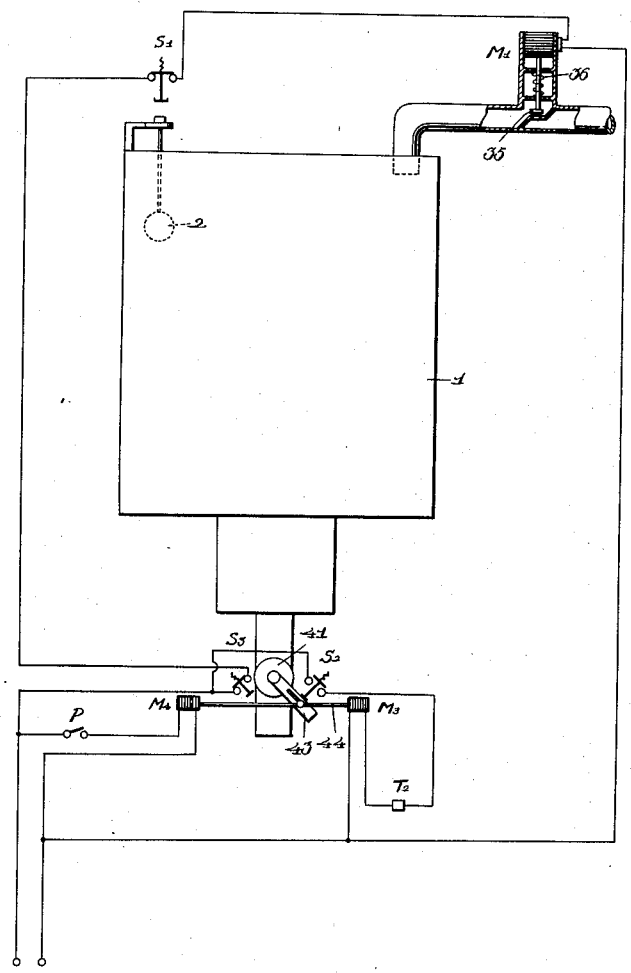

Figure 4 shows another embodiment of the present invention. When tank 1 is charged with a predetermined amount of a fluid, the switch S1 is opened by means of the float 2, the circuit of the electromagnet M1 in the feed valve is opened, and thereby valve 35 is closed by spring 36. When switch P is closed the electromagnet M4 is excited, the valve operating lever 43 is turned by the operating rod 44 to the open position, the discharge valve 41 is opened and thus the discharge of a fluid is effected. In response to turning of operating lever 43, as aforesaid, switch S2 is closed, but since time switch T2 in series with electromagnet M3, is open at this time, the latter remains de-energized until switch T2 closes after the tank has been emptied. When the fluid level drops, float 2 is lowered, and switch S1 is closed. As a fluid is further lowered, discharging will be completed. After time limit switch is closed following completion of discharge, electromagnet M3 is excited. Therefore the operating lever 43 is restored to the position of the full line shown, the discharge valve 41 is closed, the switch S3 is closed, the electromagnet M1 is excited to close the switch S1, the feed valve 35 is opened and thus charging is begun. In this species the functions of the electromagnets M5 and M6 in the species of Figures 1, 2 and 3, are effected by electromagnets M3 and M4

If the connections to electromagnets M6 and M5 are interchanged, the sequence of operations is reversed, that is, a predetermined mass of fluid will first be fed into the tank, followed by closure of the feed valve and automatic opening of the dispensing or discharge valve.

Various modifications can be made within the scope of the invention.

What I claim is:

1. In an apparatus for sequentially measuring and dispensing a predetermined quantity of liquid, a tank, a solenoid-operated feed valve controlling flow into said tank, an electrically-operated discharge valve controlling flow from said tank, a first circuit including circuit-closing means responsive to rise of liquid in said tank to a predetermined level and the solenoid of said feed valve, a second circuit including said discharge valve, first and second control switches in said first and second circuits, respectively, solenoid means energizable to close one said control switch while simultaneously opening the other, and a manually-closable circuit to energize said solenoid means.

2. In an apparatus for sequentially measuring and dispensing a predetermined quantity of liquid, a tank, feed means for said tank including a solenoid-controlled inlet valve, discharge means for said tank including a solenoid-controlled outlet valve, a float switch operated by and in response to attainment of a predetermined upper level of liquid in said tank, a first circuit including the solenoid of said inlet valve and said float switch, a second circuit including the solenoid of said outlet valve, a solenoid-operated control switch operable to alternately close one said circuit while opening the other, a manually-controlled circuit including a solenoid of said control switch energizable to close said second circuit, and open said discharge valve, and means operating said discharge valve to close the same after said predetermined quantity of fluid has been discharged from said tank.

3. In an apparatus for sequentially accumulating and dispensing a predetermined quantity of fluid, a measuring tank, feed means for said tank including a solenoid-operated inlet valve, discharge means for said tank including a solenoid-operated outlet valve, a circuit closer comprising a float-controlled switch operated by and in response to rise to a predetermined level of fluid in said tank, a first circuit including the solenoid of said inlet valve and said float-controlled switch in series, a second circuit including the solenoid of said outlet valve and said circuit closer, and a solenoid-operated control switch operable to alternately close one of said first and second circuits while simultaneously opening the other.

4. In an apparatus for sequentially accumulating and dispensing a predetermined quantity of liquid, a tank, inlet means for said tank including a solenoid-operated inlet valve, discharge means for said tank including a solenoid-operated outlet valve, a first circuit including the solenoid of said inlet valve, a circuit closer in said first circuit energizing the solenoid of said inlet valve to close the same by and in response to accumulation of said predetermined quantity of liquid in said tank, a second circuit including the solenoid of said outlet valve, a control device including control switches in each of said first and second circuits, solenoid means manually energizable to alternately open one said control switch and simultaneously close the other, a relay controlling said second circuit to close said outlet valve, and means responsive to drop of fluid in said tank to a predetermined lower level to energize said relay.

5. An apparatus for sequentially accumulating and dispensing a predetermined quantity of liquid comprising a tank, feed means for said tank including a solenoid-operated inlet valve, means for dispensing liquid from said tank including an electrically-operated outlet valve circuit-closing means responsive to rise of liquid in said tank to a predetermined level, a first circuit including the solenoid of said inlet valve and said circuit-closing means to close said inlet valve in response to attainment of said predetermined level, first and second control switches, electromagnetic means operable to close one said control switch and simultaneously open the other, manually-controlled circuit means for said electromagnetic means, first circuit means responsive to closure of said second control switch to open said outlet valve and simultaneously close said inlet valve, and time-controlled circuit means closing said outlet valve and opening said inlet valve after discharge of said predetermined quantity of liquid from said tank.

References Cited in the file of this patent

UNITED STATES PATENTS

| | | |
|---|---|---|
| 2,380,884 | Von Stoser et al. | July 31, 1945 |
| 2,396,527 | Osborne | Mar. 12, 1946 |
| 2,786,603 | Holmberg et al. | Mar. 26, 1957 |
| 2,867,354 | Tanzola et al. | Jan. 6, 1959 |